US 8,810,535 B2

(12) United States Patent
Moosavi

(10) Patent No.: US 8,810,535 B2
(45) Date of Patent: Aug. 19, 2014

(54) ELECTRONIC DEVICE AND METHOD OF CONTROLLING SAME

(75) Inventor: Vahid Moosavi, Kitchener (CA)

(73) Assignee: BlackBerry Limited, Waterloo (CA)

( * ) Notice: Subject to any disclaimer, the term of this patent is extended or adjusted under 35 U.S.C. 154(b) by 267 days.

(21) Appl. No.: 13/275,987

(22) Filed: Oct. 18, 2011

(65) Prior Publication Data
US 2013/0093691 A1   Apr. 18, 2013

(51) Int. Cl.
*G06F 3/041* (2006.01)
(52) U.S. Cl.
USPC ............................................. 345/173; 345/156
(58) Field of Classification Search
CPC .................. G06F 2203/04808; G06F 3/04883; G06F 3/041
USPC .......................................................... 345/173
See application file for complete search history.

(56) References Cited

U.S. PATENT DOCUMENTS

| | | | | |
|---|---|---|---|---|
| 7,411,575 | B2 * | 8/2008 | Hill et al. ........................ | 345/156 |
| 7,656,393 | B2 | 2/2010 | King et al. | |
| 7,656,394 | B2 | 2/2010 | Westerman et al. | |
| 7,924,271 | B2 | 4/2011 | Christie et al. | |
| 2005/0046621 | A1 * | 3/2005 | Kaikuranta .................... | 345/173 |
| 2005/0168441 | A1 | 8/2005 | Obitsu et al. | |
| 2007/0262964 | A1 | 11/2007 | Zotov et al. | |
| 2008/0165140 | A1 * | 7/2008 | Christie et al. ................ | 345/173 |
| 2008/0284749 | A1 * | 11/2008 | Hsu et al. ...................... | 345/173 |
| 2009/0174679 | A1 * | 7/2009 | Westerman ..................... | 345/173 |
| 2010/0026656 | A1 | 2/2010 | Hotelling et al. | |
| 2010/0053861 | A1 | 3/2010 | Kim et al. | |
| 2010/0105443 | A1 * | 4/2010 | Vaisanen ........................ | 455/566 |
| 2010/0302172 | A1 | 12/2010 | Wilairat | |
| 2010/0328227 | A1 | 12/2010 | Matejka et al. | |
| 2011/0115721 | A1 | 5/2011 | Li et al. | |
| 2011/0205163 | A1 | 8/2011 | Hinckley et al. | |
| 2011/0209097 | A1 | 8/2011 | Hinckley et al. | |
| 2011/0209098 | A1 | 8/2011 | Hinckley et al. | |
| 2011/0304566 | A1 * | 12/2011 | Han ............................... | 345/173 |
| 2012/0044173 | A1 * | 2/2012 | Homma et al. ................ | 345/173 |
| 2012/0098766 | A1 * | 4/2012 | Dippel et al. .................. | 345/173 |
| 2012/0127206 | A1 * | 5/2012 | Thompson et al. ............ | 345/661 |
| 2012/0256829 | A1 * | 10/2012 | Dodge ........................... | 345/157 |
| 2013/0093685 | A1 * | 4/2013 | Kalu et al. ..................... | 345/173 |

FOREIGN PATENT DOCUMENTS

| | | |
|---|---|---|
| EP | 1645945 A2 | 4/2006 |
| EP | 1942401 A1 | 7/2008 |
| EP | 2214089 A2 | 8/2010 |
| EP | 2306286 A1 | 4/2011 |
| WO | 2006/020304 A2 | 2/2006 |
| WO | 2011/041885 A1 | 4/2011 |
| WO | 2011/126502 A1 | 10/2011 |

OTHER PUBLICATIONS

XP55014037, "iPod touch User Guide—for iPhone OS 3.0 Software", published Dec. 31, 2009, pp. 1-153.

(Continued)

*Primary Examiner* — Van Chow
(74) *Attorney, Agent, or Firm* — Geoffrey deKleine; Borden Ladner Gervais LLP

(57) ABSTRACT

A method includes detecting a touch associated with an edge of a display of an electronic device, identifying a navigation device function associated with the touch, and performing the navigation device function.

7 Claims, 6 Drawing Sheets

(56) References Cited

OTHER PUBLICATIONS

Partial European Search Report dated Feb. 22, 2012, issued from the corresponding EP patent application No. 11185588.8.
International Search Report and Written Opinion of the International Searching Authority dated Jan. 24, 2013, issued in respect of corresponding International Patent Application No. PCT/CA2012/000950.
Office Action dated Feb. 11, 2013, issued in respect of corresponding European Patent Application No. 11185588.8.
Extended European Search Report dated Jun. 1, 2012, issued from the corresponding EP patent application No. 11185588.8.
Roth et al., "Bezel Swipe: Conflict-Free Scrolling and Multiple Selection on Mobile Touch Screen Devices", CHI, Apr. 4-9, 2009, 4 pages.

* cited by examiner

ELECTRONIC DEVICE AND METHOD OF CONTROLLING SAME

FIELD OF TECHNOLOGY

The present disclosure relates to electronic devices including, but not limited to, electronic devices having displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with displays are desirable.

DETAILED DESCRIPTION

Figure 1:
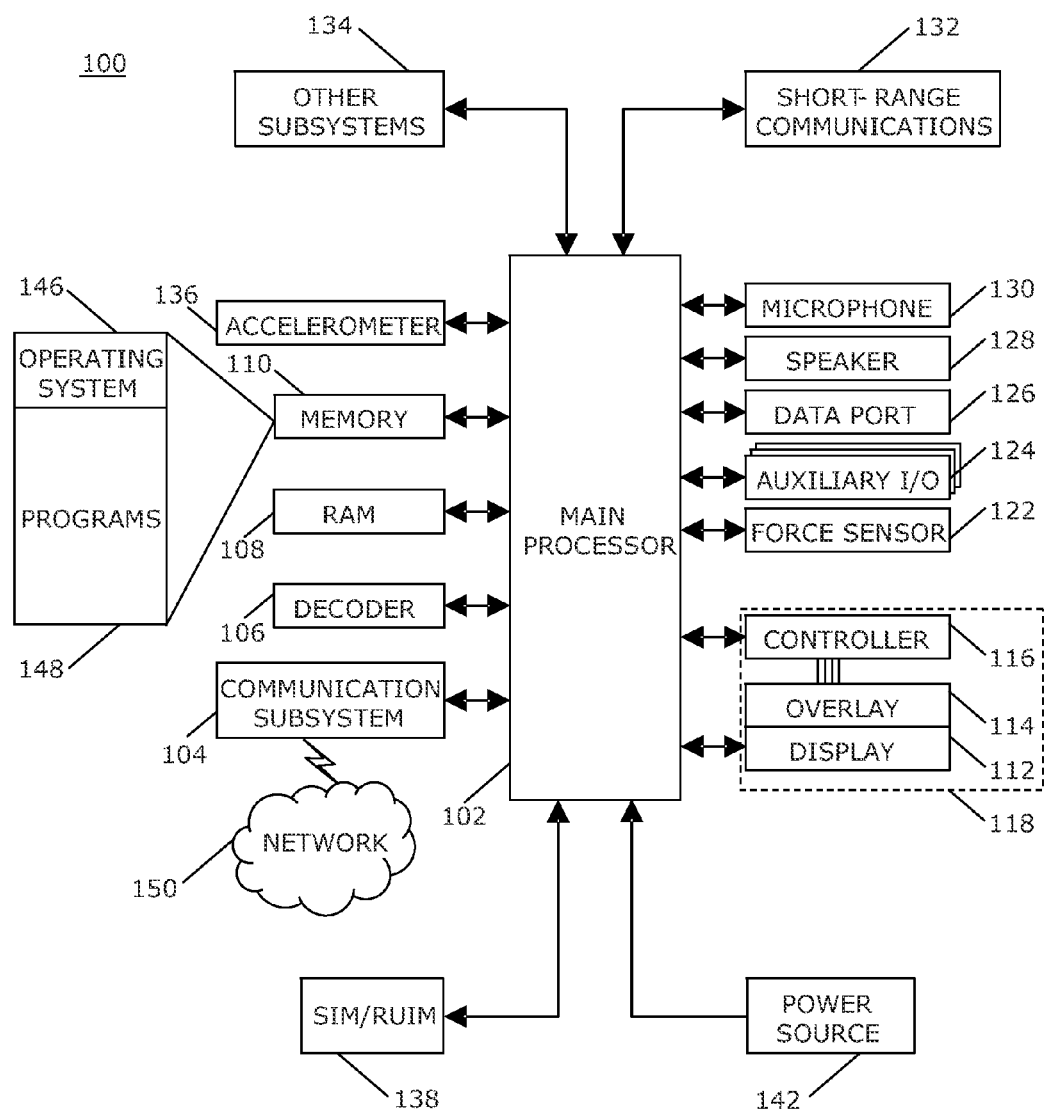
FIG. 1 is a block diagram of a portable electronic device in accordance with an example embodiment.

The following describes an electronic device and a method that includes detecting a touch associated with an edge of a display of an electronic device, identifying a navigation device function associated with the touch, and performing the navigation device function.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100, which may be a portable electronic device, includes multiple components, such as a processor 102 that controls the overall operation of the electronic device 100. The electronic device 100 presently described optionally includes a communication subsystem 104 and a short-range communications 132 module to perform various communication functions, including data and voice communications. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on an electronic device, is displayed on the touch-sensitive display 118 via the processor 102. The processor 102 may interact with an orientation sensor such as an accelerometer 136 to detect direction of gravitational forces or gravity-induced reaction forces, for example, to determine the orientation of the electronic device 100.

To identify a subscriber for network access, the electronic device 100 may optionally use a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example. For voice communications, the overall operation of the electronic device 100 may be similar. The speaker 128 may output audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable contact member, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Touches may also include multi-touches or multiple touches that overlap at least partially in time. For example, when touches overlap at least partially in time, the touches may have different start times, different end times, or the touches may have one or more of the same start and end times, as long as any part of one touch coincides in time with any part of the other touch.

One or more gestures may also be detected by the touch-sensitive display 118. A gesture, such as a swipe, also known as a flick, is a particular type of touch on a touch-sensitive display 118 and may begin at an origin point and continue to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time. Multi-touch gestures including multiple touches that overlap at least partially in time may also be detected.

An optional force sensor 122 or force sensors is disposed in any suitable location, for example, between the touch-sensitive display 118 and a back of the electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
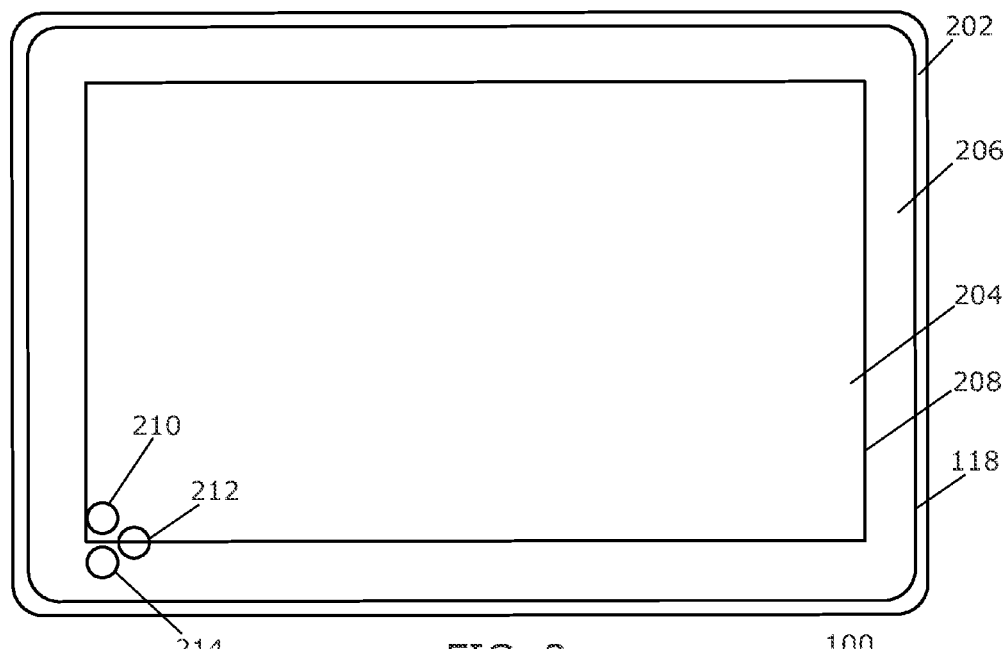
FIG. 2 is a front view of an example of an electronic device in accordance with the disclosure.
Figure 4:
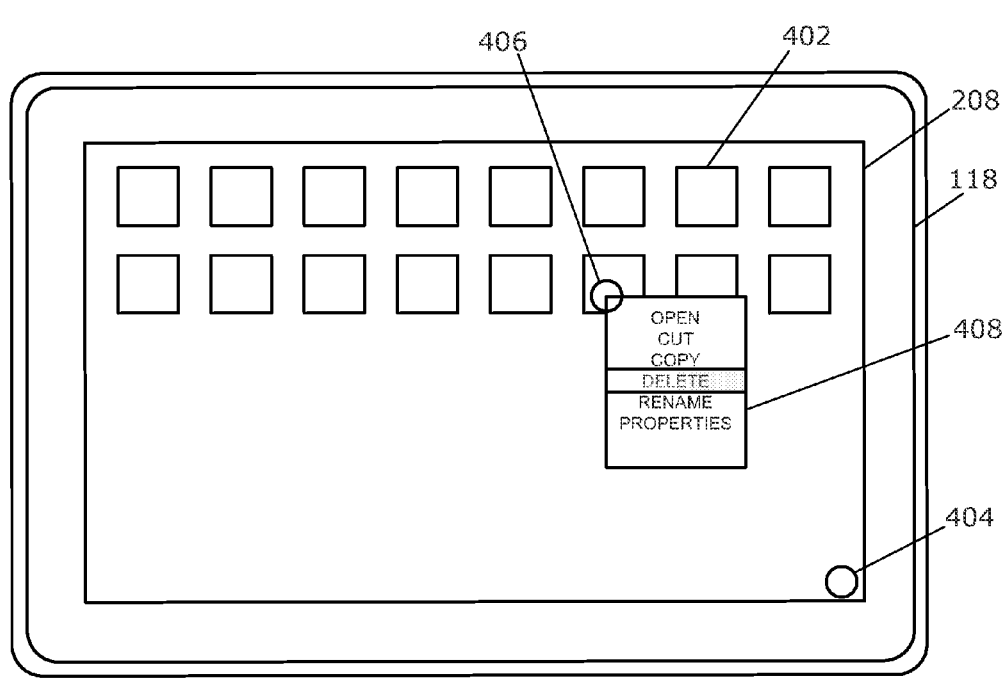
FIG. 4 through FIG. 8 illustrate examples of touches associated with an edge of the display of the electronic device in accordance with the disclosure.

A front view of an example of the electronic device 100 is shown in FIG. 2. The electronic device 100 includes a housing 202 in which the touch-sensitive display 118 is disposed. The housing 202 and the touch-sensitive display 118 enclose components such as the components shown in FIG. 1. The display area 204 of the touch-sensitive display 118 may be generally centered in the housing 202. The non-display area 206 in this example extends around the display area 204 such that an edge or boundary 208 is located between the display area 204 and the non-display area 206.

A touch may be associated with an edge of the touch-sensitive display 118, e.g., when the touch is in the display area 204 at a location 210 that is at or near an edge of the display area 204 (such as the boundary 208 between the display area 204 and the non-display area 206), when the touch is at a location 212 partially within the non-display area 206 and partially within the display area 204, when the touch is at a location 214 completely within the non-display area 206, when the touch is a gesture that at least in part is associated with the edge or boundary 208 or the non-display area 206, such as a gesture that starts, ends, or goes through the edge or boundary 208 or the non-display area 206, and so forth. For example, a touch that is within a threshold distance of the edge or boundary 208 may be associated with the edge. Touches that are associated with the edge 208 of the display 118 may be associated with a navigation device function, such as a left mouse-click function, a right mouse-click function, scrolling, cursor movement, and/or a drag-and-drop function.

The touch-sensitive overlay 114 of the touch-sensitive display 118 may extend to cover the display area 204 and at least part of the non-display area 206, such that a touch on either or both the display area 204 and the non-display area 206 may be detected. The touch sensors may extend across part or all of the non-display area 206 of the touch-sensitive overlay 114. The density of touch sensors may differ between the display area 204 and the non-display area 206. For example, the density of nodes in a mutual capacitive touch-sensitive display, or density of locations at which electrodes of one layer cross over electrodes of another layer, may differ between the display area 204 and the non-display area 206.

Figure 3:
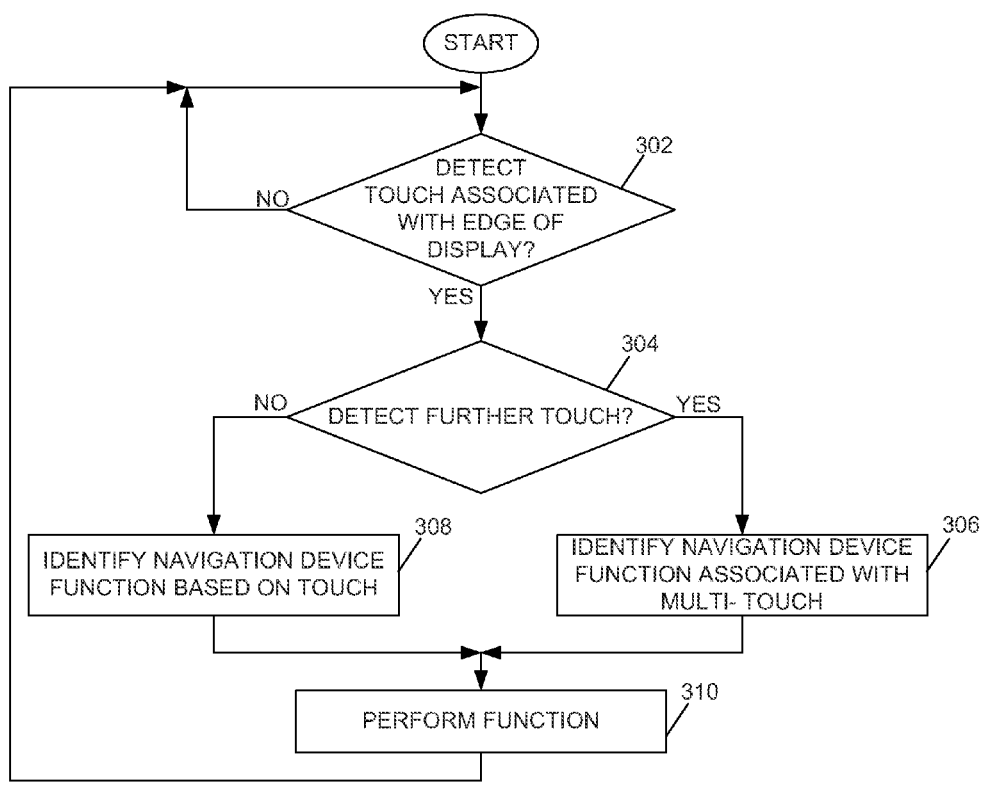
FIG. 3 is a flowchart illustrating a method of controlling the electronic device in accordance with the disclosure.
Figure 5:
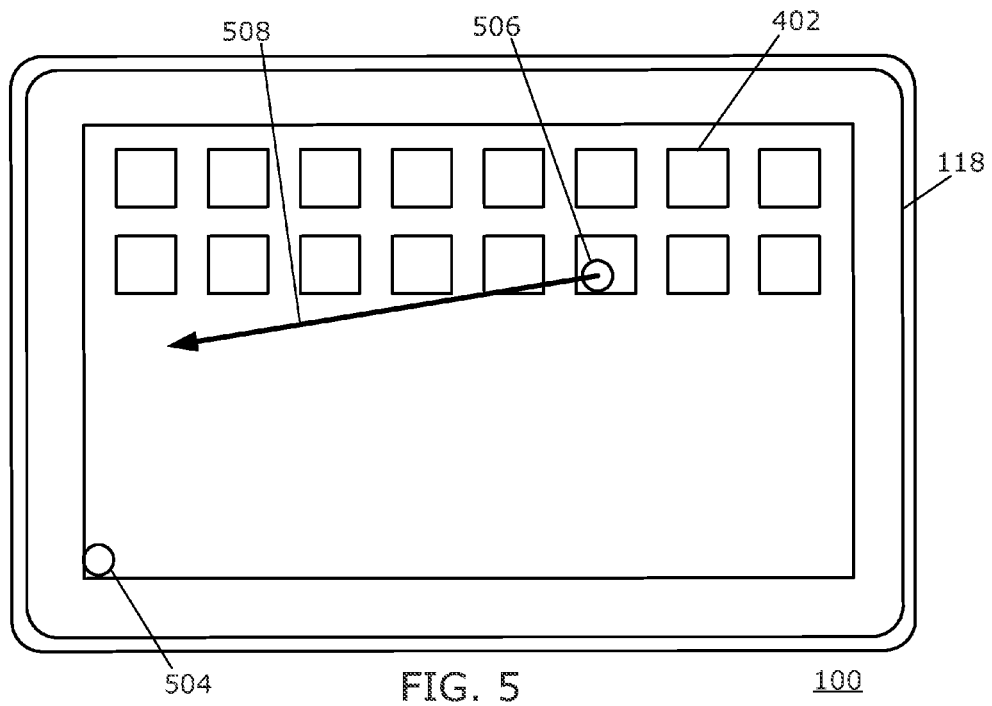

A flowchart illustrating a method of controlling an electronic device, such as the electronic device 100, is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

The process may be carried out when information is displayed on the touch-sensitive display 118. The information may be information associated with a home screen, or any suitable application, such as email, text messaging, calendar, tasks, address book, Webpage, word processing, media, or any other suitable application in which information is displayed. The information is not limited to the examples provided.

When a touch that is associated with an edge of the touch-sensitive display 118 is detected 302, the process continues at 304. A touch that is associated with an edge of the touch-sensitive display 118 is identified by attributes of the touch. A touch may be associated with an edge of the touch-sensitive display 118 such as described above.

For example, the touch may be a gesture that is associated with an edge, such as gesture having an origin point and/or any part of the path of the gesture associated with the edge.

When a separate touch, which overlaps at least partially in time with the touch that is associated with the edge, is detected 304 on the touch-sensitive display 118, the process continues at 306, where the touches are handled as multiple touches or a multi-touch. A navigation device function is identified 306 based on the multi-touch characteristics or attributes. The separate touch may be, for example, a touch associated with the display area 204 of the touch-sensitive display 118 and may be spaced from the edge. Thus, a multi-touch or multiple touches may be detected and may be associated with the edge of the touch-sensitive display 118 when at least one of the touches is associated with the edge.

The identified navigation device function may be based on, for example, the location of the touch that is associated with the edge or boundary 208. For example, the navigation device function that is associated with the touch may be based on which side of a center of the touch-sensitive display 118 the touch is detected or located. Alternatively, the navigation device function that is associated with the touch may be based on where the edge associated with touch is located, for example, whether the edge is horizontal or vertical, near a top, a bottom, a left side, or right side of the touch-sensitive display 118. Optionally, the navigation device function that is associated with the touch may be based on which of a plurality of predetermined areas the touch is associated with or detected on. The terms horizontal, vertical, top, bottom, left, right, upward, downward, are utilized herein to provide reference to the orientation of the electronic device 100 in the figures and are not otherwise limiting.

The identified navigation device function may also be based on touch attributes of either or both of the detected touches. For example, the navigation device function may be based on whether the touch includes a gesture, the origin of the gesture, the end point, direction, the speed, and/or any combination of these attributes. The identified navigation device function is a function typically associated with a navigation device, such as a mouse, an optical joystick, a trackball, thumbwheel, or other navigation device. For example, mouse functions, such as left click, right click, scroll, cursor movement, and drag and drop, are performed in response to touches mapped onto mouse functions. A user may easily utilize touch actions similar to mouse actions, resulting in a more user-friendly touch interface. Examples include a touch associated with the left edge for a left mouse click, a touch associated with the right edge for a right mouse click, a vertical gesture associated with a vertical edge for vertical scrolling, a horizontal gesture associated with a horizontal edge for horizontal scrolling, and a touch associated with any edge to engage drag-and-drop.

When a separate touch, which overlaps at least partially in time with the touch that is associated with the edge, is not detected 304, the process continues at 308, e.g., another touch does not overlap at least partially in time with the touch that is associated with the edge. A navigation device function is identified 308 based on the detected touch. The identified navigation device function may be based on touch attributes of the detected touch. For example, the navigation device function may be based on whether the touch includes a gesture, the origin, the end point, direction, the speed, and/or any combination of these attributes.

The identified navigation device function is performed 310. The identified navigation device function is performed, for example, by providing the identified navigation device function to the operating system of the electronic device 100, an application running on the electronic device 100, or a subroutine or a secondary application or program called from a primary location.

Examples of touches associated with an edge of the display of the electronic device 100 are shown in FIG. 4 through FIG. 7. In the examples illustrated in FIG. 4 through FIG. 7, a plurality of selectable features 402 are displayed on the touch-sensitive display 118. The selectable features may be, for example, icons, virtual keys, buttons, text, uniform resource locators (URLs), or any other selectable feature. The selectable features may be associated with applications or programs, documents, pictures, movies, songs, and so forth. Although the examples shown illustrate selectable features such as icons, keys, or buttons, the method described may be utilized when other information is displayed, including, for example, characters of text, uniform resource locators (URLs), email, media files such as pictures, videos, or songs, or any other information.

When one touch is associated with an edge and is located on a right side of the touch-sensitive display 118, and another touch that overlaps at least partially in time is detected on the touch-sensitive display 118, the associated function may be a right mouse-click function. In the example illustrated in FIG. 4, a touch that is associated with the edge is detected, and a touch that is associated with one of the selectable features 402 is detected. The touch locations are illustrated generally by the circles 404, 406. The touch that is associated with the edge and the touch associated with the selectable feature 402 overlap at least partially in time in this example. The touch that is associated with the edge is generally located on a right side of center of the touch-sensitive display 118 with respect to the current orientation of the touch-sensitive display 118. The associated navigation device function is a right mouse-click function. When the right mouse-click function is performed in this example, a menu 408 including a plurality of selectable features is displayed on the touch-sensitive display 118. In this example, the menu 408 is displayed near the touch that is associated with selectable feature 402, and the selectable features displayed in the menu 408 are based on the location of the touch illustrated by the circle 406. The menu 408 provided for a touch associated with one of the selectable features 402 may differ from the menu provided for a touch that is not associated with one of the selectable features 402. Any one of the selectable features in the menu 408 may be selected, for example, when a touch is detected on an area on the touch-sensitive display 118 that is associated with the feature.

Figure 6:
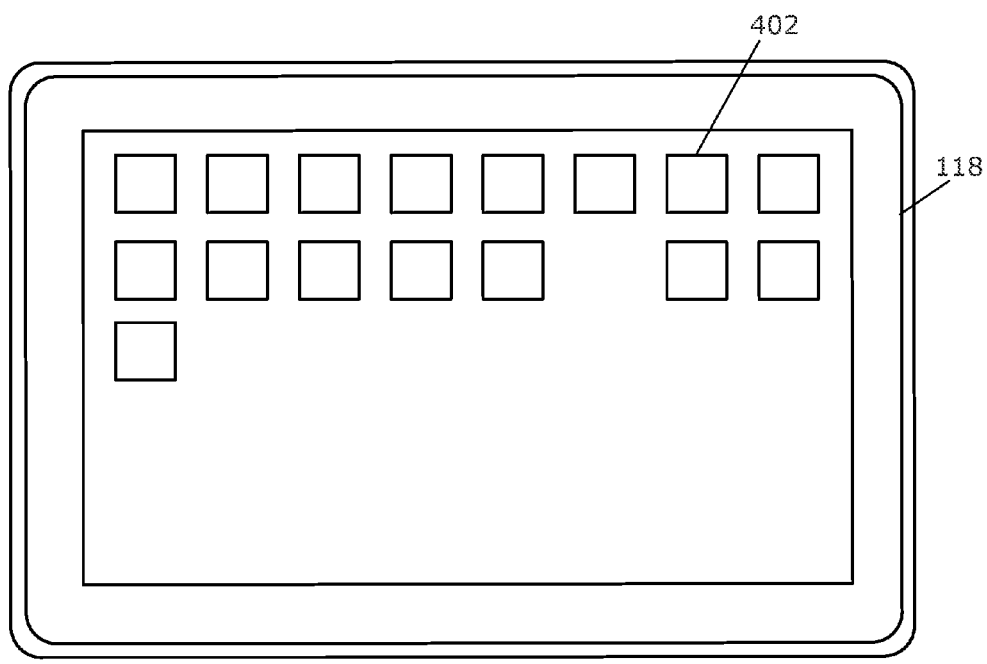
Figure 7:
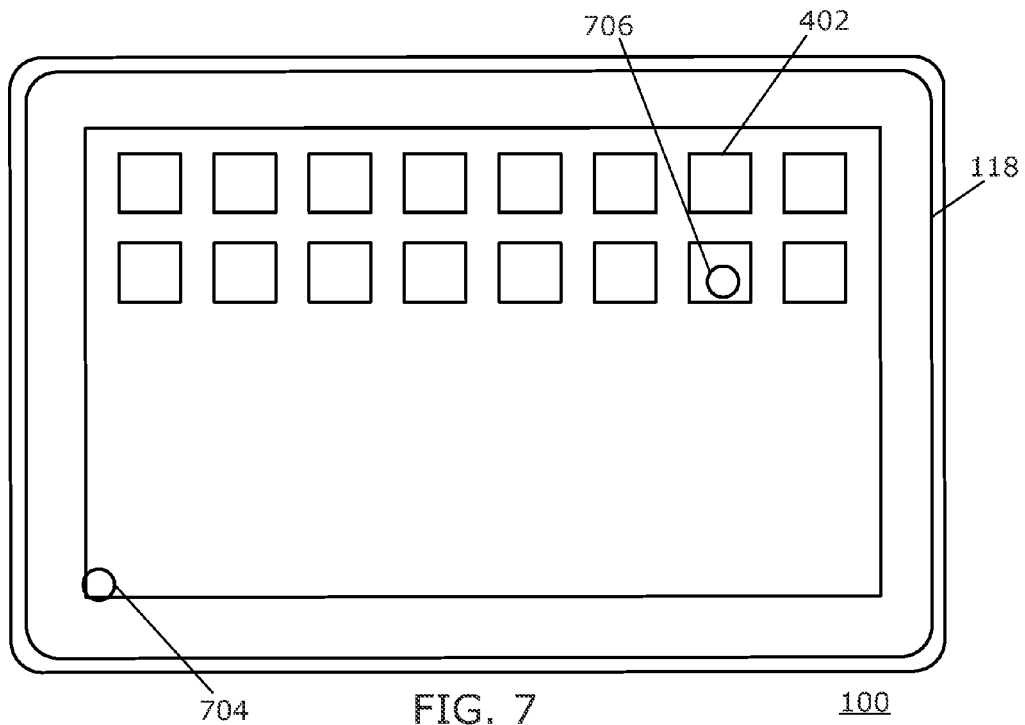

When one touch is associated with an edge of the touch-sensitive display 118, and the other touch is a gesture that begins at an origin associated with a selectable feature, the associated function may be a drag-and-drop function. In the example illustrated in FIG. 5, a touch that is associated with the edge is detected and a touch that is associated with one of the selectable features 402 is detected. The touches are illustrated generally by the circle 504 and the circle 506. The touch that is associated with the edge and the touch associated with the selectable feature 402 overlap at least partially in time. The touch that is associated with the edge may be associated with any edge, although the touch is located on a left side of the center of the touch-sensitive display 118 with respect to the current orientation of the touch-sensitive display 118 in this example. The touch that is associated with the selectable feature 402 is a gesture in a direction generally downward and to the left as illustrated by the arrow 508. An option may be provided to facilitate a selection by the user of which edge is associated with a drag-and-drop function or other functions described herein. The associated navigation device function is a drag-and-drop function and the selectable feature 402 associated with the touch is dragged and dropped at a new location at or near the end of the gesture, such as illustrated in FIG. 6.

When one touch is associated with a left side of the touch-sensitive display 118, and the location of another touch, that overlaps the touch at least partially in time, is generally unchanged during the touch, the associated function may be a left mouse-click function. In the example illustrated in FIG. 7, a touch that is associated with the edge is detected, and a touch that is associated with one of the selectable features 402 is detected. The touches are illustrated generally by the circles 704, 706. The touches overlap at least partially in time. The touch that is associated with the edge is generally located on a left side of the center of the touch-sensitive display 118 with respect to the current orientation of the touch-sensitive display 118. The associated navigation device function is a left mouse-click function, and the left mouse-click function is performed. The selectable feature 402 associated with the touch is selected.

A single touch on the touch-sensitive display 118 may also be utilized to select any of the selectable features 402.

Figure 8:
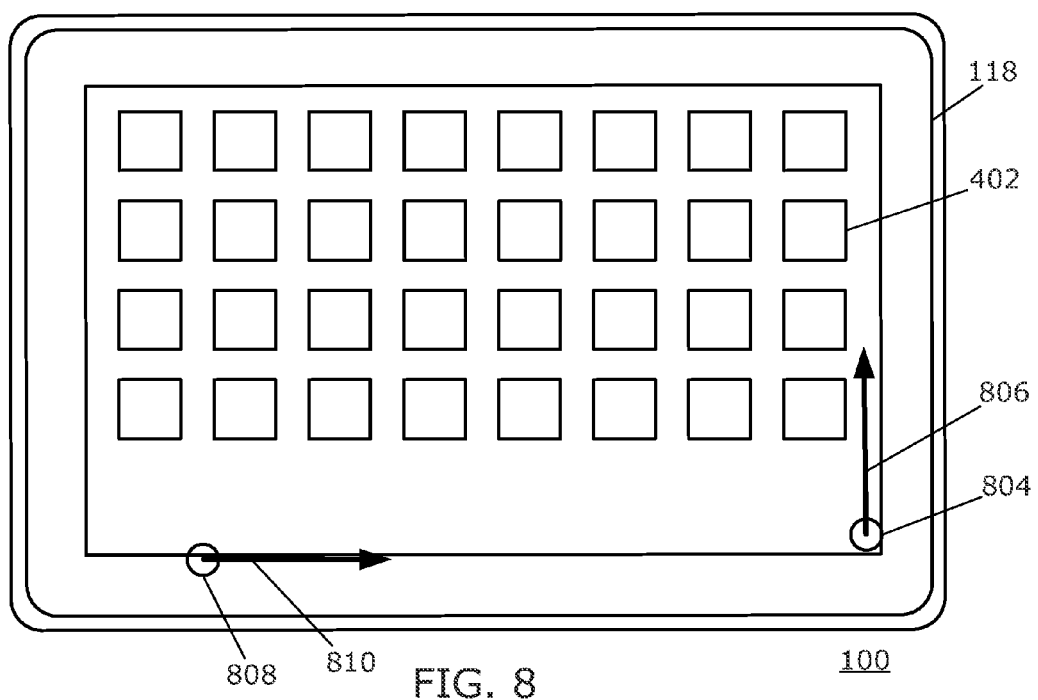

When a touch that is associated with the edge is a gesture that moves generally parallel with or along one side of the edge, the associated navigation device function may be a scrolling function. For example, an upward or downward scrolling gesture along one a right edge and/or a left edge may scroll displayed information upwardly or downwardly. A right or left scrolling gesture associated with the top and/or bottom edges may scroll displayed information to the right or left. In the example of FIG. 8, an upward gesture is detected beginning at the origin illustrated by the circle 804 and following the path illustrated by the arrow 806. The gesture is associated with the edge because the gesture is generally located within a threshold distance of the edge. A second touch is not detected and the associated navigation device function is a scrolling function. The information displayed on the touch-sensitive display 118 is scrolled to display additional selectable features 402. In the example of FIG. 8, a horizontal gesture to the right is detected beginning at the origin illustrated by the circle 808 and following the path illustrated by the arrow 810, which gesture is associated with the bottom edge, resulting in scrolling in the respective direction.

Figure 9:
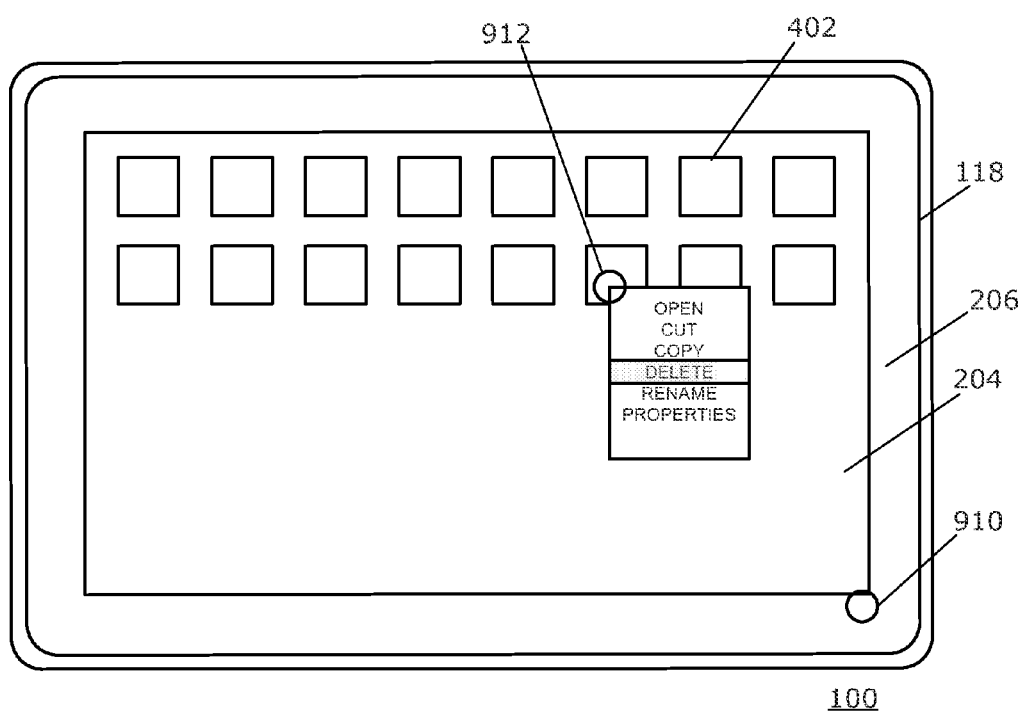
FIG. 9 illustrates another example of a touch associated with an edge of the display in accordance with the disclosure.

An example of a touch associated with an edge of the display of electronic device 100 is illustrated in FIG. 9. In the example of FIG. 9, the touch location 910 is at a location associated with the non-display area 206, such as a touch location wholly within the non-display area 206. A touch in this example is associated with an edge of the touch-sensitive display 118 when the touch location is associated with or within the non-display area 906.

In this example, a touch that is associated with the edge is detected, and a touch that is associated with one of the selectable features 902 is detected. The touches are illustrated generally by the circles 910, 912. The touch that is associated with the edge and the touch associated with the selectable feature 902 overlap at least partially in time. The touch that is associated with the edge is generally located on a right side of the touch-sensitive display 918 with respect to the current orientation of the touch-sensitive display 918. The associated navigation device function is a right mouse-click function, and the right mouse-click function is performed.

The electronic device in the examples of FIG. 4 through FIG. 9 may or may not include touch sensors in the non-display area 206 of the electronic device 100. Each of the examples of navigation functions described herein may be utilized on a device 100 with touch sensors in the non-display area 206 or without touch sensors in the non-display area 206. For example, touch locations associated with or located within the display area 204 and associated with an edge may alternatively be associated with or located within the non-display area 206 or both the display area 204 and the non-display area 206 when the device 100 includes touch sensors in the non-display area 206. Alternatively, touch locations associated with or located within the non-display area 206 and associated with an edge may alternatively be associated with or located within the display area 204 near or at the edge when the device 100 does not include touch sensors in the non-display area 206. Although the examples shown in the figures may have specific attributes, these attributes may apply to each of the other examples as applicable.

Navigation device functionality, such as mouse functions or other navigation device functions, may be mapped to touches that are associated with an edge of the touch-sensitive display. Such a mapping provides navigation device functionality for devices with touch-sensitive displays, which devices do not include or are not connected to a navigation device. Thus, a user may utilize a more intuitive touch system, similar to known navigation device interactions, e.g., mouse actions, when utilizing a touch-sensitive display.

A method includes detecting a touch associated with an edge of a display of an electronic device, identifying a navigation device function associated with the touch, and performing the navigation device function. An electronic device includes a display and a processor coupled to the display and configured to detect a touch associated with an edge of the display, identify a navigation device function associated with the touch, and perform the navigation device function. A method includes detecting a first touch associated with an edge of a touch-sensitive display of an electronic device, and when a second touch is detected on the touch-sensitive display, which second touch overlaps at least partially in time with the first touch, displaying a plurality of selectable features associated with the second touch.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a first touch on a touch-sensitive display of an electronic device;
   in response to detecting the first touch within a threshold distance of a boundary between the display area of the touch-sensitive and a non-display area, and to detecting a second touch that overlaps at least partially in time with the first touch:
   identifying a right mouse-click function associated with the first touch and the second touch based on a location of the first touch and the location of the second touch and performing the right mouse-click function when the location of the first touch is near the boundary on a right side of the touch-sensitive display with respect to a current orientation of the touch-sensitive display;
   identifying a left mouse-click function associated with the first touch and the second touch based on the location of the first touch and performing the left mouse-click function when the location of the first touch is near the boundary on the left side of the touch-sensitive display with respect to a current orientation of the touch-sensitive display;
   wherein the left mouse-click function comprises a drag-and-drop function when the second touch begins at a location associated with a selectable feature and moves to a new location, and wherein the left mouse-click function comprises a selection when the second touch begins at the location associated with the selectable feature and remains generally unchanged during the touch;
   in response to detecting only the first touch and to detecting that the first touch comprises a gesture along the boundary between the display area and the non-display area:
   Performing a scrolling function based on the direction of the gesture along the boundary.

2. The method according to claim 1, wherein performing the mouse-click function comprises displaying a plurality of selectable features based on a location of the second touch.

3. The method according to claim 1, wherein when the mouse-click function is a right mouse-click function, performing the mouse-click function comprises displaying a menu of selectable options associated with the second touch.

4. The method according to claim 1, wherein detecting the first touch near the boundary comprises detecting the first touch when the location of the first touch is on the non-display area of the touch-sensitive display.

5. A non-transitory computer-readable storage device having computer-readable code executable by at least one processor of the electronic device to perform the method of claim 1.

6. An electronic device comprising:
   a touch-sensitive display;
   a processor coupled to the touch-sensitive display and configured to:
   detect a first touch on a touch-sensitive display
   in response to detecting the first touch within a threshold distance of a boundary between a display area of the touch-sensitive and a non-display area, and to detecting a second touch that overlaps at least partially in time with the first touch:
   identify a right mouse-click function associated with the first touch based on a location of the first touch and a location of the second touch and perform the right mouse-click function when the location of the first touch is near the boundary on a right side of the touch-sensitive display with respect to a current orientation of the touch-sensitive display;
   identify a left mouse-click function associated with the touch based on the location of the first touch and perform the left mouse-click function when the location of the first touch is near the boundary on the left side of the touch-sensitive display with respect to a current orientation of the touch-sensitive display;
   wherein the left mouse-click function comprises a drag-and-drop function when the second touch begins at a location associated with a selectable feature and moves to a new location, and wherein the left mouse-click function comprises a selection when the second touch begins at the location associated with the selectable feature and remains generally unchanged during the touch;
   in response to detecting only the first touch and to detecting that the first touch comprises a gesture along the boundary between the display area and the non-display area:
   perform a scrolling function based on the direction of the gesture along the boundary.

7. The electronic device according to claim 6, wherein when the mouse-click function comprises a right-mouse-click function, performing the mouse-click function comprises displaying a menu of selectable options associated with a displayed feature.

* * * * *